INVENTOR.
RONALD M. CENTNER
JOHN R. VAN ANDEL

ATTORNEY

INVENTOR
RONALD M. CENTNER
JOHN R. VAN ANDEL
BY

ATTORNEY

INVENTORS
RONALD M. CENTNER
JOHN R. VAN ANDEL

ATTORNEY

United States Patent Office 3,365,634
Patented Jan. 23, 1968

3,365,634
NUMERICALLY CONTROLLED ELECTRONIC POSITIONING SYSTEM EMPLOYING SERIAL LOGIC
Ronald M. Centner, Southfield, and John R. Van Andel, Dearborn, Mich., assignors to The Bendix Corporation, Detroit, Mich., a corporation of Delaware
Filed Feb. 19, 1964, Ser. No. 346,001
23 Claims. (Cl. 318—18)

ABSTRACT OF THE DISCLOSURE

An electronic control system is operative to receive numerical commands representative of the desired position of an output member from a storage media, and to control a motor system to run at either a high or low speed, to move the output to the commanded position. An electrical representation of a command from the tape is established in normal binary form if the commanded position is in a first direction or complemented form if the commanded position is in a second position. Similarly, signals from a feedback transducer connected to the output member are used to establish either straight binary or complemented representations of the actual position of the output member. An adder receives the command representation directly and the position representation through a selectively controlled complementer. The output of the adder is a serial signal which is sent to a serial control unit essentially consisting of a pair of two state devices. One of the devices sequentially examines each of the digits of the output of the adder to determine if the commanded and actual positions are in accord with one another. The other two state devices sequentially examines each output digit of the adder to determine the extent of disagreement between the commanded and actual positions if they are not in accord. The two state devices control an output drive system so as to either stop or operate at a high or low speed. The selective complementer is controlled by the output of the two state devices so as to complement the output of the position command if the output of the adder takes one form, and to refrain from complementing it if the output of the adder takes another form. The decision of the two state devices also controls their setting for the examination of the next sequential output of the adder.

This invention relates to an electronic system for positioning an output member in accordance with numerical data.

The present invention falls into the class of electronic control systems in which input data is supplied in the form of a series of commands constituting coordinates of desired positions expressed in absolute terms with respect to a common reference point. The control system converts successive commands into electrical signals which are then compared with other electrical signals representing the actual position of the output device. Any difference between the commanded position and the actual position of the output device causes an electrical signal to be generated which energizes a motor system to cause the output device to move in a direction such as to bring its actual position into accord with the commanded position. The positions are stored and the operations are performed on a digital basis in control systems formed in accordance with the present invention and the present invention specifically relates to a unique control system designed to utilize a minimum number of components so as to be low in cost and reliable in operation.

In the present invention, the input data is preferably provided on a punched tape in binary coded decimal form. The control system accepts the data representing one set of coordinates at a time and converts it into binary form and stores it on a recirculating delay line. Another delay line stores a binary representation of the present position of the output device. This representation is obtained by algebraically summing a series of pulses representing incremental movements of the output device generated by a suitable transducer physically connected to the output device. The control system then compares these command and position representations and provides as an output one of three electrical signals depending upon whether the command and position stores are equal, or they are different and their difference is greater or less than a predetermined magnitude. These electrical signals actuate the motor system which moves the output device at a high or "slewing" speed if the commanded position representations are different and their difference exceeds the predetermined magnitude; at a slower or "stepping" speed if the command and position representations are different and the difference is less than a predetermined magnitude; or stops the control device when the command and position are equal. The specific nature of the actuating system which accepts the three signals from the control system and moves the output device, does not form part of the present invention and the details of such a system are known to the art, a particular system being disclosed in U.S. Patent No. 3,246,218, issued Apr. 12, 1966, to Ronald M. Centner et al.

The present invention may be used to control one or more axes of a control system. In the preferred embodiment of the invention, which is subsequently disclosed in detail, two axes are controlled and a two-part operational cycle is employed. In the first part of the cycle a particular command, or set of commands for a plurality of axes, is read off the tape by the machine, converted from the binary coded decimal notational system in to straight binary form and stored as a position command on a recirculating delay line. When this "loading" half cycle is completed, the control system goes into its second mode or half cycle wherein the position and command signals are repeatedly compared and control signals are generated to actuate the motor system. As the motor system moves the output device, feedback signals modify the position numbers on another recirculating delay line. This operation continues until the command and position signals are identical, at which point the motor system is shut off and the control system reverts to the next loading cycle wherein the next command is read from the tape and converted into a position signal. The preferred embodiment of the invention utilizes a plurality of logical elements for two separate purposes during the loading and compare half cycles. For example, a full adder is employed during the load cycle incident to the conversion of the binary coded decimal data into binary form. During the compare cycle this same adder acts to sum the command signal with some form of the position signal in order to achieve the comparison function. These units which perform a dual function are connected to their cooperating elements in both modes at all times; however, conditioning elements make one or the other of their set of connections active during each particular mode.

During the load cycle the information relating to one set of coordinates is read off the tape and decoded to provide electrical signals in binary coded decimal form indicating the various motion commands and their signs. The digits of a command number are read off the tape one at a time with the most significant digit first. In order to convert this binary coded decimal information into binary form, each digit is stored, then multiplied by 10, and then added to the succeeding digit. This sum is again stored and multiplied by 10 and added to the next following digit until all the digits of the number have been read off of the tape. The multiplication by 10 is achieved by delaying the digits of a number by one bit and then by 3 bits and then adding these two partial products together. The "load" cycle is terminated and the "compare" cycle initiated when a signal on the tape indicating the end of one command is read off. This actuates a flip-flop if all other attendant conditions are correct, providing a conditioning signal which, in effect, re-connects all the components into their comparison arrangement.

During the loading cycle all of the command signals accompanied by negative signs are stored on the delay line in 2's complement form. This is in accordance with a novel and simplified comparison scheme which will subsequently be described. When the compare cycle starts the contents of the command register are fed into the full adder along with a signal which represents a particular form of the contents of the position register. This form may either be the 2's complement or the 1's complement of the contents of the position register. Whether it is the 2's complement or the 1's complement is dependent upon the sign of the sum generated by the full adder during the last comparison cycle. The full adder adds the contents of the command register to the modified output of the position register. If the sum of the full adder is positive during one addition, then on the next addition the adder will sum the command signal with the 2's complement of the position signal. If the sum arrived at by the full adder is negative during one addition, in the next addition the adder will sum the command signal with the 1's complement of the position signal. By adding the command signal to the 2's complement of the position signal, as is done when the previous sum was positive, the adder is performing the following subtraction operation:

Error=Command−Position

Adding the 2's complement of position to command is the same as subtracting the first number from the second. Thus, when the error signal in one cycle is positive, the output of the full adder during the next cycle will be the true error in binary form. When the output of the full adder is negative in one cycle the output of the full adder in the next cycle will be the 1's complement of the error. The nature of the output from the full adder during the previous cycle also determines the arrangement of the error detection logic for the next cycle. When the output of the full adder is the true error in binary form equality between the command and position are indicated by all zeroes. It is apparent that a single dual stage storage device such as a flip-flop is capable of detecting this condition. The presence of any 1's indicates that there is an error. When the output of the full adder is in the form of 1's complement this condition is reversed and all 0's indicate an error and all 1's indicate an equality. Again, a single flip-flop properly conditioned is capable of detecting this. Similarly, the determination of the magnitude of the error may be made by a single flip-flop properly conditioned to detect either a 1 or a 0 in one of the more significant bit positions, depending upon the nature of the last output of the full adder. One of the major advances of the present invention lies in this greatly simplified detection circuit.

Since the nature of the error detection process is dependent on the sign of the error detected in the cycle— which is assumed to be of the same sign as the error in the previous cycle—the detection process is invalid if the error sign changes during a cycle. Means are, therefore, provided to store the error sign and during any cycle in which this sign store changes state, the results of the error detection process are disregarded and the motor system continues to drive the output in the same manner as in the last cycle.

It is, therefore, seen to be an object of the present invention to provide a numerically controlled positioning system wherein both the commanded position and the actual position are stored in binary coded digital form and digital means is provided to compare the two in order to provide a signal to a motor device.

A further object is to provide such a system wherein such comparison device utilizes a minimum number of components through use of various techniques based on complementary number systems. A further object is to provide such a system which undergoes a first loading cycle and a second comparison cycle, using the same components in each cycle to perform different tasks.

Other objects, advantages and applications of the present invention will be made apparent by the following detailed description of the preferred embodiment of the invention. The description makes reference to the accompanying drawing in which.

The preferred embodiment of the invention is constructed in a manner similar to other digital computers and controls. In addition to the tape reader and the magnetostrictive re-circulating delay lines and the motor control equipment, the control system is composed of digital components primarily comprising flip-flops, "AND" gates "OR" gates and other elements such as pulse generators and amplifiers.

Figure 1:
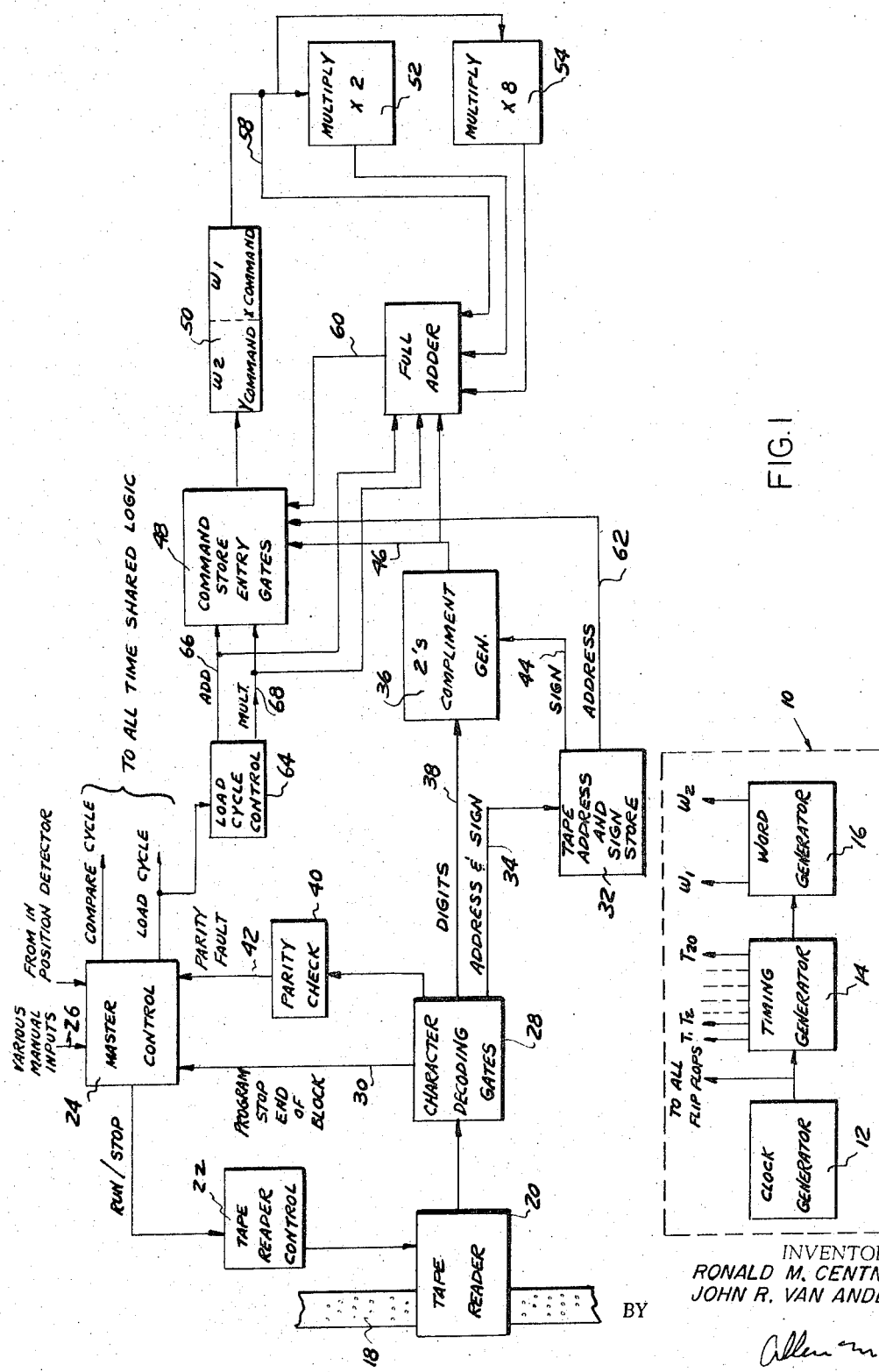
FIGURE 1 is a block diagram of that portion of the circuitry of the preferred embodiment of the invention which is employed in the load cycle.
Figure 2:
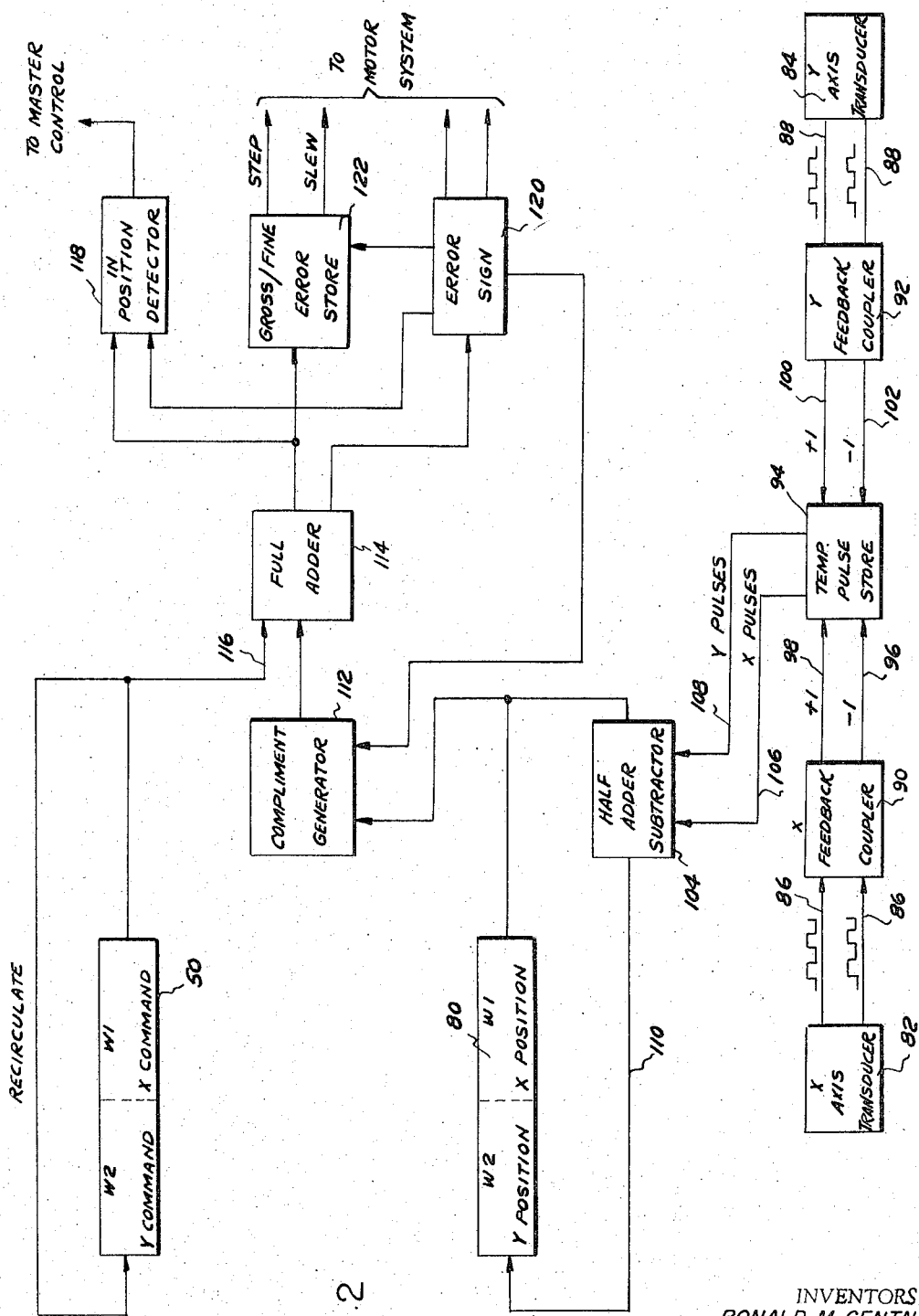
FIGURE 2 is a schematic block diagram of the circuitry employed during the compare cycle in the preferred embodiment.

The invention is illustrated in block form in FIGURES 1 and 2. FIGURE 1 illustrates those components which are employed during the load cycle wherein numerical information is read from the tape, converted into binary form, and stored in an appropriate section of the delay line. FIGURE 2 illustrates in block form those components which are employed during the compare cycle wherein the command information, previously stored in the delay lines is compared with the actual position information and the motor system is actuated to bring the position information and the motor system is actuated to bring the position information into accord with the command information. As has been noted, certain of the components and structural blocks are employed in both the load and compare cycles on a time-sharing basis. In the following description, these time shared components have been illustrated as if two separate units perform the two functions. In the practical construction of the device various well-known switching techniques are used to connect these components to the associated circuitry so that they may be employed on a time shared basis.

Referring to FIGURE 1, the digital circuitry of the present invention is operated on a synchronous basis under the control of a clock generally indicated at 10. The basic pulse source is a clock generator 12 which forms part of the clock circuitry and which in the preferred embodiment produces 200,000 pulses per second. Each pulse is preferably 0.4 microseconds in width and the pulses are separated from one another by 5 microseconds. The output of the clock generator 12 is supplied to all of the flip-flops used in the control system and acts as a conditioning input to the flip-flops on both Set and Reset. That is, when all other conditions necessary for a flip-flop to change condition are present the change in state will occur upon the output of the next pulse from the clock generator 12.

The output of the clock generator 12 is supplied to a timing generator 14 which is shown in block form and constitutes a four flip-flop binary counter with associated diode gating which produces a sequential series of pulses on twenty output lines which are denominated $T_1$ through $T_{20}$. The output of the $T_{20}$ pulse is fed to a word generator 16 which constitutes a single flip-flop which is alternately set and reset by $T_{20}$ and provides its output on two lines which are denominated $W_1$ and $W_2$. A single iteration cycle of the delay lines thereby constitutes a total of two words of twenty bits each. The preferred embodiment of the invention is designed to control two perpendicular axes which are denominated the X and Y axes. In other embodiments the invention might be applied to control some other number of axes and a different number of word times would be employed.

The input information for the preferred embodiment of the invention is recorded in punched form on a standard paper tape 18. Information is preferably embodied on the tape in that format which is employed as standard in the United States at this time wherein the tape has eight channels which contain coded symbols in the form of punched characters indicating the address of a particular word, that is, whether it is for the X or Y axis, and the command itself in binary coded decimal form with each digit occupying one transverse line of the tape. The information on the tape is translated into electrical signals by a tape reader 20 which may be of any conventional variety and provides as its output electrical signals representing the presence or absence of a hole in each of the eight channels of the tape.

The tape reader 20 is started and stopped by a tape reader control 22 which acts under the control of a master control unit 24. The master control 24 contains the circuitry which determines whether the control is in the load or compare cycle and when the tape reader 20 should be started or stopped. The input information to the master control comprises various manual inputs 26 which may be derived from the manual control board of the system and which the operator initiates to indicate whether the control system should be on or off and whether it should be run manually or automatically as well as other conditioning inputs which are conventional in this art and will not be described.

Upon receipt of an appropriate start cycle from one of the manual inputs 26, master control 24 will provide an initial output on the "load cycle" line. The control system will then go through the operations of reading information from the tape, converting numbers into binary form from their binary coded decimal form and loading this information into the command storage recirculating register. This operation will be continued until the tape reader decodes a signal on the tape which indicates that all of the information relating to one set of commands has been provided. This signal causes the master control to provide an output signal on the "compare cycle" line and remove the signal from the "load cycle" line. The compare cycle signal continues until the master control receives a signal from "in position detector," which will be subsequently disclosed, indicating that the motor unit has moved the output device to the position dictated by the command signals. At this point the master control again goes into the load cycle. This continues until the tape reader provides the master control with a signal indicating that the end of a program coded on the tape has been reached.

The raw data from the tape reader 20, indicating which of the holes across the width of the tape are punched in any one line is provided to character decoding gates 28. These gates constitute diode circuitry constructed in a manner known to those skilled in the art which provide output signals indicating the nature of the character coded on the tape. These signals may constitute end of block or program stop which are provided to the master control on line 30; an address such as X or Y indicating the nature of a subsequent coded number, which are provided to a tape address and sign storage unit 32 by means of line 34; or the various digits themselves which are fed to block 36 which constitutes a 2's complement generator by means of line 38. Additionally, the character decoding gates unit 28 provides an output signal to a parity check block 40 which counts the number of channels punched across the width of the tape. As is well known to those skilled in the art the tape includes a parity column which plays no part in the code but is punched when necessary to provide an even number of punches across the width of the tape. If the parity check unit 40 counts an odd number of punches rather than an even number it provides a signal on line 42 to the master control causing the master control 24 to shut down the tape reader and to initiate an alarm signal so that the operator may determine the source of error.

To summarize, an appropriate manual input signal on line 26 initially places the master control into the load cycle and starts the tape reader. The tape reader 20 provides output signals to the character decoding gates 28, indicating which channels across its width are punched AND gates 28 decode the signals to provide an appropriate output on an appropriate line indicating the nature of the coded tape reader signal. The first signals on the tape will be the address and sign of a number to follow and these are supplied to the tape address and sign store 32 where they are retained until a new address and sign are read off the tape reader. The digits which follow are read one by one and supplied on line 38 to the 2's complement generator 36.

This unit 36 receives the sign of the number being read from the storage unit 32 on line 44 and acts to generate the 2's complement of a digit being received if the sign is negative. If the sign is positive, the 2's complement generator does not operate on the digit. In either case, the 2's complement of a negative number or the straight binary form of a positive number are provided on line 46 to command storage entry gates 48.

The 1's complement of a number is formed by inverting the bits of the number, that is, all the 1's are changed to 0's and the 0's are changed to 1's. The 2's complement is formed by adding a 1 to the least significant digit place of the 1's complemented number. The complemented form of a number is frequently used in computer circuits as it allows both addition and subtraction operations to be formed by an adder without regard to the sign of the input numbers. That is, when negative numbers are changed into complement form they may be simply added to other numbers to obtain the algebraic sum of the two numbers. Therefore, the unit 36 converts all negative numbers into their 2's complement form and leaves positive numbers in their straight binary form.

The next function of the load cycle is to convert the digits emerging from the 2's complement generator 36 on line 46 to straight binary form from their binary coded decimal form and to store them in the appropriate section of a command register 50. The command registers used in the preferred embodiment of the invention constitute serial recirculating magnetostrictive delay lines which, along with their normally associated input and output equipment provide delays of two word times or 40 bits. The command delay line 50 is used to retain the X command in the first word space ($W_1$) and the Y command in the second word space ($W_2$). The command store entry gates 48 are so conditioned by the timing pulses to admit the various digits of the command words at the appropriate times.

During the entire operational cycle the X numbers are operated upon during the $W_1$ word time and the Y numbers are operated upon during the $W_2$ word time. Each number, both position and command, consists of twenty bits which occur from $T_1$ to $T_{20}$ of that number's associated word time. The numbers are stored in the delay lines 50 and 80 and fed to the comparison circuit with the most significant digit first.

The conversion of the binary coded decimal information of the tape into the binary form is achieved by reading off the most significant digit from the tape and storing it. Then, the first digit is multiplied by 10 and re-stored. In the next iteration cycle it is added to the next digit from the tape. This process is repeated as long as there are additional digits in the number being read off the tape. The multiplication of a digit by ten is achieved by putting the number through two flip-flop storage devices which respectively delay the number 1 and 3 bit times.

A 1 bit delay is equivalent in the binary system to multiplication by 2 and a 3 bit delay is equivalent to multiplication by 8. Adding the output of these two delay units provides a product which is the original number multiplied by 10.

In the preferred embodiment this multiplication by 10 is achieved by a 1 bit delay unit 52 and a 3 bit delay unit 54. Both of these units provide their outputs to a full adder 56 which also receives the numbers direct from the storage unit via line 58. The full adder 56 also receives the numbers direct from the storage unit via line 58. The full adder 56 also receives digits read off of the tape from the 2's complement generator on line 46. Its output is provided on line 60 to the command store entry gates 48. The command store entry gates also receive the X or Y address of the number being read from the address storage unit on line 62.

The multiplication and storage of the command numbers is performed under the control of a load cycle unit 64. This load cycle unit is activated by the master control 24. It operates under the control of the clock 10, and provides appropriate conditioning signals to the command store entry gates 48 on lines 66 and 68. In the preferred embodiment to the invention the load cycle 64 is also conditioned by signals from the tape reader, indicating whether the tape reader is in condition to read a digit or traveling between the lines. These connections have been omitted for the sake of simplicity as they are well-known to those skilled in the art. In practice, as soon as the master control provides an output on the "load cycle line" the load cycle control issues a multiplication signal on line 68 at the beginning of the next iteration cycle. At the beginning of the next iteration cycle the add command occurs and continues until the beginning of the next iteration cycle. Under the control of these signals, the command store gates accept the first digit of a number read off the tape from the full adder on line 60 where it has been added to the previous contents of the register which is 0. It is then admitted to the appropriate section of the delay line 50. At the beginning of the multiplication cycle as signalled from the load cycle control 64, this number is removed from the delay line 50, multiplied by 2 and 8. These products are added together and the sum is again entered in the command line 50 through the gates 48. In the next cycle this product is read out and provided to the full adder on line 58 where it is added to the next digit from the tape. The sum is then again entered in the appropriate section of the command register 50. This process is continued until all of the digits of a number have been added. When all of the numbers contained in a particular block on the tape have been converted into binary form and entered into appropriate sections of the delay line, an end of block signal from the character decoding gates 28 causes the master control to go into the compare cycle.

The components used in the compare cycle are disclosed in FIGURE 2. During the compare cycle the circuitry in FIGURE 2 determines the difference between command information stored in the recirculating delay line 50 and position information stored in a second recirculating delay line 80 and provides signals to a motor system which will move the output device in an appropriate direction to bring the position data into accord with the command data. The components which generate the position store are operative during both the load and comparison cycles. The motion of the output device (not shown) is detected by an X axis transducer 82 and a Y axis transducer 84. The transducers 82 and 84 are preferably of the type which produce pulses for each small increment of motion of the driven member. Each transducer produces a series of square waves. The level of one square wave at the time that the other square wave is changing state indicates the direction of motion. The X axis transducer provides these square waves on two lines 86 while the Y axis transducer provides these two pulse trains on lines 88. The phase relationship of the two pulse trains may be decoded by couplers 90 and 92 to determine the direction of motion of the driven member.

The two feedback couplers 90 and 92 provide pulses to a temporary storage register 94. Each of the couplers is connected to the storage register by a pair of lines which carry positive and negative pulses. The feedback coupler 90 provides negative pulses to the storage register 94 on line 96 and positive pulses on line 98. Similarly, the Y feedback coupler 92 provides positive pulses on line 100 and negative pulses on line 102. The temporary pulse storage register 94 receives these pulses AND gates them out to a half adder-subtracter 104 on line 106 which carries X pulses and line 108 which carries Y pulses.

The half adder-subtracter 104 is connected within the recirculating line 110 of the position store recirculating delay line 80. It acts to add positive pulses into the numbers contained in the store and to subtract negative pulses from these numbers. This process is formed so that positive results in the store are maintained in straight binary form and negative numbers are maintained in 2's complement form.

The output of the position delay line 80 is fed to a complement generator 112. This generator is similar to the 2's complement generator 36, used in the loading cycle, and makes use of the basic components of the unit 36 on a time-shared basis. Its function is to generate either the 1's or the 2's complement of the position store depending upon the sign of the error determined in the last comparison cycle. The method of generating this error will be noted subsequently. At present it is sufficient to say that the complement generator 112 provides as an output the 2's complement of the contents of the position store if the previous comparison cycle noted a positive error and the 1's complement if the previous comparison cycle noted a negative error.

The complement generator 112 has an input 114 from an error sign detection unit 120. Basically, the complement generator always generates the 1's complement of the contents of the position storage and then adds a 1 to the result if the error sign unit 120 signals a positive error in order to obtain 2's complement. It should be noted that this complementing process is performed in the same manner whether the position stored in the delay line 80 is a negative number, already in 2's complement form, or a positive number in straight binary form. When the position store is negative and in 2's complement form the complement generator actually generates the complement (either the 1's or the 2's complement) of the 2's complement form.

This complementing process is performed so that position may be subtracted from command in the following full adder 114. Complementing an already complemented number (as is done with a negative position sign) the original positive number is regenerated. The adder 114 then generates command and position which is the equivalent of Command (−Position).

The output of the complement generator 112 is fed to the full adder 114 which is the time-shared equivalent of the full adder 56 used in the load cycle. The other input to the full addder 114 is on line 116 and represents the output of the command storage delay line 50. The output of the full adder 114 represents the sum of the position storage plus the output of the complement generator 112.

Before description of the circuitry which receives this sum and analyzes it to provide the appropriate signals to the motor system it will be instructive to consider the nature of this output for various command and positioning conditions.

There are six possible relationships between the command and position with regard to sign of the numbers and sign of the error. They are as follows:

| Command Store Sign | Position Store Sign | Error Sign | Adder Sum 114 Equals |
|---|---|---|---|
| Positive | Positive | Positive | Absolute value of error. |
| Do | do | Negative | 1's complement of error. |
| Negative | Negative | do | Do. |
| Do | do | Positive | Absolute value of error. |
| Positive | do | do | Do. |
| Negative | Positive | Negative | 1's complement of error. |

Several examples will indicate the nature of the comparison process and the results attained thereby.

Assume command and position both positive and position error positive (that is command is larger than position). In this case the binary representation of command will be added to the 2's complement representation of position. This is equivalent to subtracting the position representation and the output of the full adder will represent the true error expressed in binary form. In the following examples the most significant digits of the numbers will not be expressed. These digits are either all 1's or all 0's and will be the same as the most significant digit shown. Assume that the command +6 and position=2. Then the 2's complement of position =110
```
  0110
  1110
  ----
  0100
```
This error will cause a signal to be generated which will actuate the motor system to drive the output device so as to bring the position signal into accord with the command. When this has occurred, the position signal in binary form, will be 0110; its 2's complement will be 1010; the error will be 0000.

In this case the command and position numbers are both negative: Command=—4 and position=—1. The error will be in a negative direction. As both command and position are negative rather than being stored as command equals 0100 and position equals 0001, they are stored in their 2's complement form as command equals 1100 and position equals 1111. In the comparison process and 1's complement of the position store=0000 is added to the command store
```
  1100
  0000
  ----
  1100
```
This 1100 represents the 1's complement of the error. This signal will cause the circuitry to generate a signal which will actuate the motor system to drive the output device so as to bring position into accord with command. This occurs when the 1's complement of position is 0011. Adding the command and position at this point
```
  1100
  0011
  ----
  1111
```
Note that when the output device is in position all 1's are generated by the full adder.

This represents the essential novelty of the comparison system: Operating upon the command and position numbers so that the in-position signal takes on one of two unique forms wherein all of the digits of the output of the full adder are either 1's or 0's. Based upon the previous sign of the otuput of the full adder, the comparison circuit is set up to simply detect the presence of either all 1's or all 0's and to provide an in-position signal when this occurs. Similarly, means are provided to identify the most significant position in which either a one or a zero occurs, depending upon the sign of the output of the full adder, for purposes of determining whether the error is a gross one wherein the slew motor should be actuated or the error is a fine one wherein a stepping motor should be actuated.

Returning to FIGURE 2, the output of the full adder 114 is presented to an in-position detector 118 which scans the output of the full adder to determine identity between the command and position signal. The output of this in-position detector 118 is provided to the master control 24 and acts to shift the system back into the load cycle. The output of the full adder 114 is also provided to an error sign unit 120, which conditions the complement generator 112, the in-position detector 118, and a gross/fine error store unit 122. All three of these units operate in a mode which is dependent upon the nature of the error signal. The gross/fine error store 122 scans the output of the full adder 114 to determine the last time cycle wherein a 1 emerges from the full adder if the error sign is positive or the first cycle wherein a 0 emerges from the adder if the error sign is negative. The digits emerge from the full adder in timed relation to the clock 10 and, therefore, the position value of a particular bit may be determined by the clock cycle of its emergence from the full adder. Thereby, the gross-fine error store 122 determines whether an output error is greater or less than a predetermined error at which the motor system is required to switch from the high speed slewing motor to the low speed stepping motor. The error sign unit 120 also provides an output sign to the motor system which is indicative of the direction of motion required by the stepping and slewing motors.

The description of the preferred embodiment of the invention up to this point is considered to be sufficiently comprehensive so that one skilled in the art of such devices could construct a unit which would operate in accordance with the invention without making any additional invention. However, for the purpose of additional clarity, certain of the circuits utilized in the preferred embodiment will be disclosed at the level of the functional gates and flip-flops.

Figure 3:
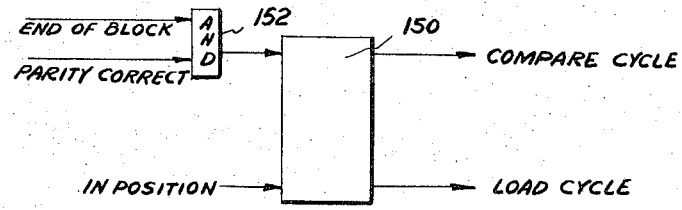
FIGURE 3 is a simplified logical diagram of that part of the master control which controls switching between the compare and load cycles.

That part of the master control 24 which exercises control over the switching between the compare and load cycles is disclosed in FIGURE 3. In essence it comprises a single flip-flop 150. As has been previously noted, the flip-flops in the system are of the type which have the clock pulse as a conditioning input for any change of state. In the forthcoming description of the circuitry, these conditioning inputs are not shown for purposes of simplification. The flip-flop 150 provides an output on the compare cycle line when it is set and on the load cycle line when it is reset.

Assuming the flip-flop to be initially reset, it becomes set upon the occurrence of an end block signal from the character decoding gates 28 and a parity correct signal from the parity check unit 40. These two inputs are provided to an AND gate 152 which acts to set the flip-flop 150 so that it provides an output on the compare cycle line. The end of the comparison cycle is signaled by an input from the in position detector 118. The in position signal switches the control into the load cycle which continues until the next end of block signal is achieved.

Figure 4:
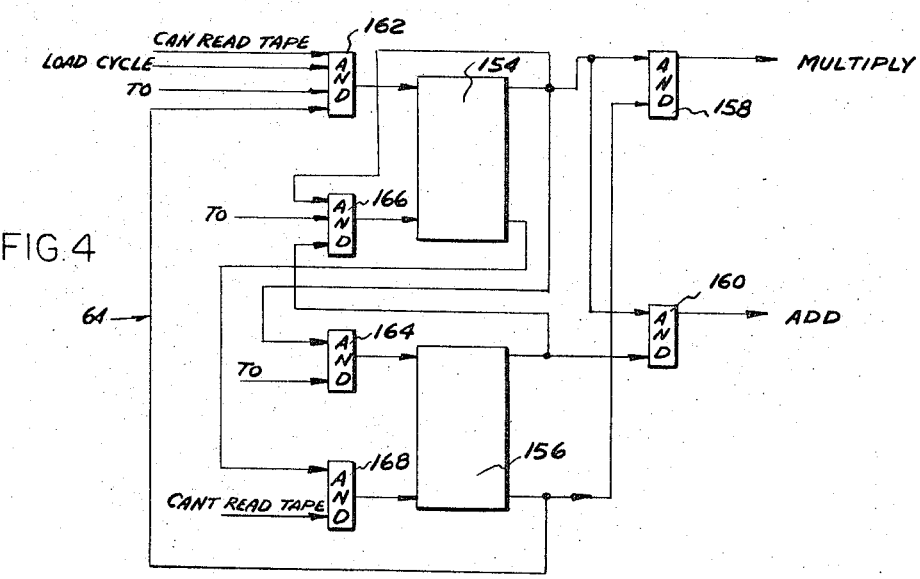
FIGURE 4 is a logical block diagram of the load cycle control.

The load cycle control 64 is formed by a pair of flip-flops 154 and 156 (FIGURE 4). The outputs of these flip-flops are provided to a pair of AND gates 158 and 160. The AND gate 158 is conditioned by flip-flop 154 being set and 156 being reset. When these conditions occur simultaneously, it provides an output which signals the multiplication portion of the cycle. The AND gate 160 is conditioned by both the flip-flops 154 and 156 being set. Its output signals the add portion of the cycle.

Assume a start condition where both the flip-flops 154 and 156 are in reset positions. The flip-flop 154 will next become set upon the occurrence of $T_0$ from the timing generator 14, "can read tape" signal from the tape reader 20 and load cycle signal from the master control 24. These three conditions as well as flip-flop 156 being in the reset condition are provided to AND gate 162, which sets the flip-flop 154. The flip-flop 154 then becomes set, providing the multiply output from the load cycle control. Upon the next occurrence of $T_0$ the flip-flop 156 becomes set through a signal from the AND gate 164. This puts the load cycle control into the add state. Upon the next occurrence of $T_0$ the flip-flop 154 becomes reset upon receiving a signal from AND gate 166. This eliminates the outputs on both the multiply and add lines. Upon the next occurrence of a "can't read tape" signal and AND gate 168 resets flip-flop 156 and returns the load cycle control to its initial state. During this time, the tape reader moves the tape until the next line can be read. When the tape reader has attained position for reading the next line, flip-flop 154 becomes set again and a new cycle begins.

Figure 5:
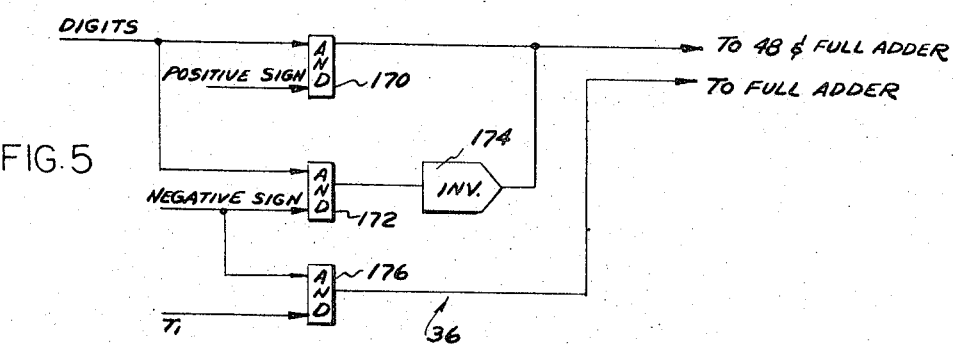
FIGURE 5 is a logical block diagram of the 2's complement generator.

FIGURE 5 illustrates the circuitry of the two's complement generator 36. This unit receives the decoded digits from the character decoding gates 28 and provides them to two AND gates 170 and 172. The AND gate 170 is conditioned by the occurrence of a positive sign signal from the tape address and sign store 32. The AND gate 172 is similarly conditioned by the occurrence of a negative sign from the store 32. If a positive sign is received, the AND gate 170 transmits the positive digits to the command store entry gates 48 and to the full adder. If a negative sign is received, the AND gate 172 feeds the digits to an inverted 174, which generates the one's complement of the digits and provides them to gates 48 and the full adder. The occurrence of a negative sign also conditions an AND gate 176, which provides an output pulse to the full adder upon the occurrence of a $T_1$ signal from the timing generator 14. This single pulse, and the inverted digits are subsequently added in the full adder to obtain the two's complement of a negative command number.

Figure 6:
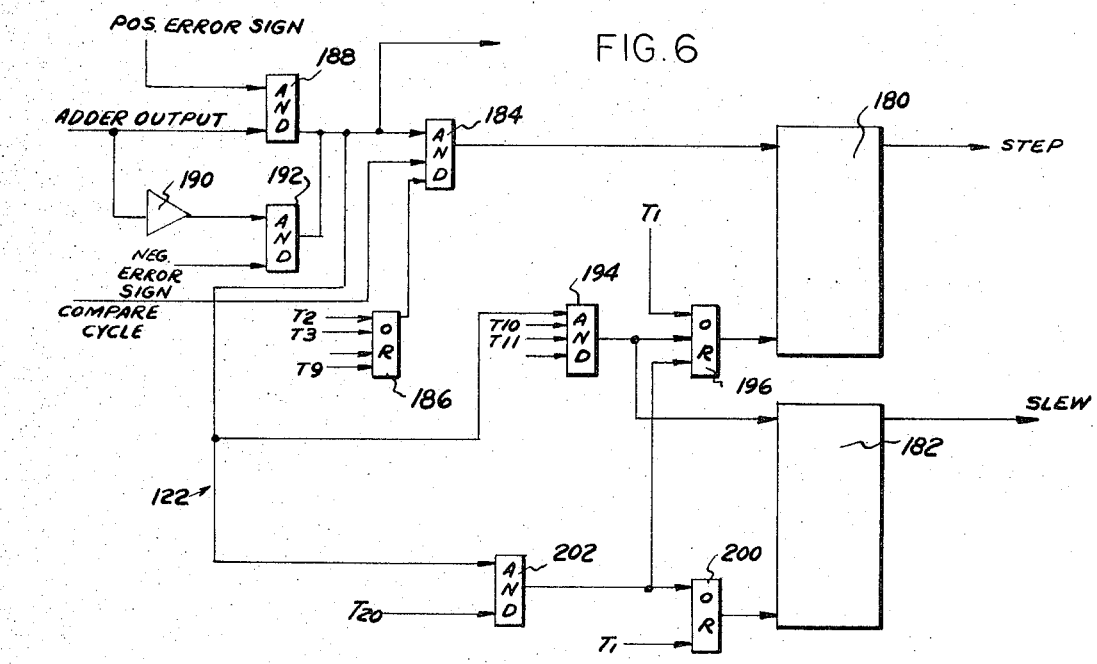
FIGURE 6 is a logical block diagram of the gross/fine error store.

The gross and fine error detection circuit 122 is illustrated in FIGURE 6. It is built around a pair of flip-flops 180 and 182. When flip-flop 180 is set a step signal is provided to the motor system. When flip-flop 182 is set a slew signal is provided to the motor system.

The flip-flop 180 is set by the output of an AND gate 184. The AND gate 184 receives the full adder output and a signal indicating the unit is in the compare cycle from the master control 24. Additionally, it receives the output of an OR gate 186 which has as inputs the timing signals $T_2$ through $T_9$.

The operation of the gross/fine error detector is dependent upon the nature of the sign of the error in the previous cycle. Therefore, the adder output is applied directly to the AND gate 188 and through an inverter 190 to an AND gate 192. The AND gate 188 is conditioned by a positive error sign, the AND gate 192 by a negative error sign. Their outputs are provided to the AND gate 184 as are the outputs of an OR gate 186 which has the timing signals $T_2$–$T_9$ as its inputs. Therefore, if either AND gate 188 or 192 provides a signal indicating adder output during the times $T_2$ through $T_9$, the flip-flop 180 becomes set and an output is provided signaling the motor control to step. However, the flip-flop 180 will become reset if a signal output is provided from either AND gates 188 or 192 during timing periods $T_{10}$–$T_{19}$. These inputs are provided to an AND gate 194 which feeds an OR gate 196. The OR gate provides output to the reset input of the flip-flop 180 upon receipt of an output from AND gate 194, an output from AND gate 202, or a $T_1$ pulse. The output of the AND gate 194 also sets the slew flip-flop 182. The slew flip-flop is reset either by a $T_1$ pulse or the occurrence of a signal output from either AND gate 188 or 192 at $T_{20}$ time. These signals are provided to an OR gate 200 which resets the flip-flop 182. An AND gate 202 develops an output pulse if there is a signal output from either AND gate 188 or 192 at $T_{20}$. Since a signal output from the adder at $T_{20}$ indicates a negative sign, neither AND gate 188 nor AND gate 192 should have an output at $T_{20}$. The occurrence of an output at $T_{20}$, therefore, indicates an incorrect error sign and resets whichever flip-flop 180 or 182 is set.

In operation, the flip-flop 180 will become set if a signal output is received during the times $T_2$–$T_9$. A fine error is indicated by the flip-flop 180 being set and no signal outputs being received at times $T_{10}$–$T_{19}$. A gross error is indicated by a signal output being received during the times $T_{10}$–$T_{19}$. This signal resets the flip-flop 180 and sets the flip-flop 182, providing a slew output error. The following $T_1$ time, whichever flip-flop is set will become reset. The step and slew signals are provided to the motor control circuit, which decodes them in order to provide the appropriate signal to the motors.

Figure 7:
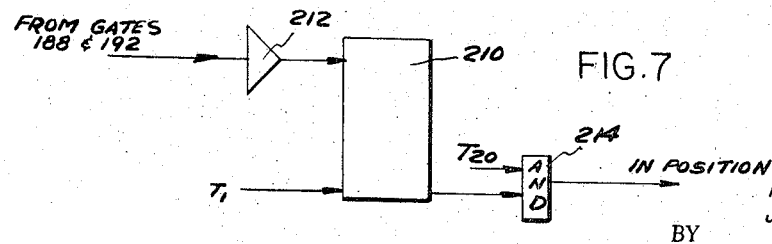
FIGURE 7 is a logical block diagram of the in-position detector.

The in position detector shown in FIGURE 7 simply comprises a single flip-flop 210 which receives the inverted adder output from an inverter 212. The adder output is taken from AND gates 188 and 192 in the gross/fine error store and it is, therefore, previously conditioned by the error sign. The flip-flop 210 is reset by a $T_1$ timing pulse and if no error signal is received from the adder, it is still reset at $T_{20}$, and an output pulse is provided by an AND gate 214 to indicate that the circuit is at the commanded position.

The temporary pulse store 94 acts as a one cycle storage register for the X and Y feedback pulses. It is designed so that when a positive and a negative feedback pulse are received within the same recirculation cycle, as may occur when the driven device undergoes vibration, the two pulses cancel each other out and no net pulse is transmitted to the position store. The temporary pulse store is also designed so that a stored pulse may be extracted at the same time as a new input pulse is stored.

Figure 8:
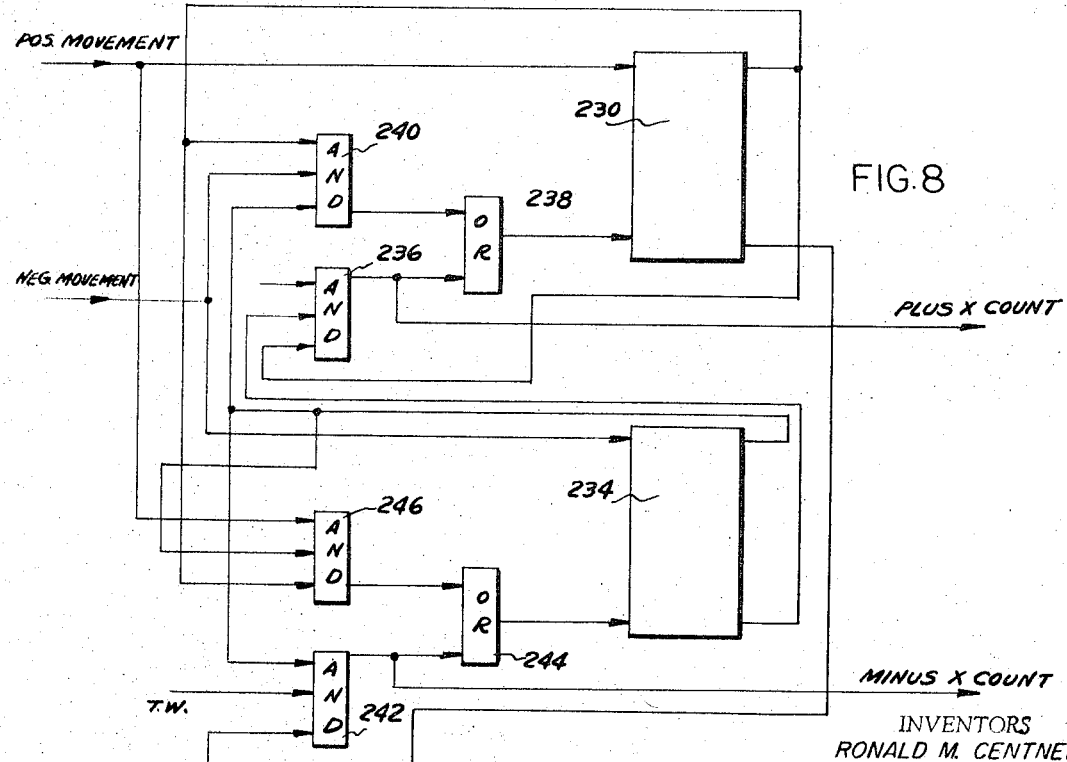
FIGURE 8 is a logical block diagram of a feedback temporary pulse store.

The X and Y halves of the pulse store 94 are identical and only the X store is disclosed in the FIGURE 8. The X storage unit is built around two flip-flops 230 and 234. The flip-flops receive pulses on lines 86 indicating either positive or negative movement of the driven member along the X axis. The flip-flop 230 is set by a pulse indicating positive movement and the flip-flop 234 is set by a pulse indicating negative movement. Output pulses to the position store are generated by the temporary pulse store at the occurrence of timing pulse $T_1$–$W_1$, which assures synchronization with the position store logic.

There are four possible conditions which may be present when the $T_1$–$W_1$ pulse is generated. If the flip-flop 230 is set and 234 is reset, a plus X count is generated at the output of AND gate 236. If 230 is reset and 234 is set a minus X count is generated at the output of AND gate 242. If both 230 and 234 are reset, no pulse is fed out. If both 230 and 234 are set, no pulse is fed out. The latter case accounts for the condition when both a positive pulse and a negative pulse are received between one $T_1$–$W_1$ pulse and the next $T_1$–$W_1$ pulse. In this case the positive pulse sets 230 and the negative pulse sets 234. Since both AND gates 236 and 242 are blocked when both 230 and 234 are set, the positive and negative pulses are effectively cancelled out. The generation of a plus X count resets 230 through OR gate 238, and the generation of a minus X count resets 234 through OR gate 244. Thus, both flip-flops will be reset after generation of an output count pulse. If both 230 and 234 are set, no output pulse is generated and neither flip-flop is reset. If a negative pulse occurs with both flip-flops set AND gate 240 will produce an output which resets 230 through OR gate 238. The resultant condition of 230 being reset and 234 being set is the proper condition for generating a minus X count. If a positive pulse occurs when both flip-flops are set, AND gate 246 will produce an output which resets 234 through OR gate 244. The resultant condition of 230 being set and 234 being reset is the proper condition for generating a plus X count. This logic thus enables cancellation of successive positive and negative pulses, and also enables extraction of a synchronized output pulse during the same iteration cycle as the receipt of the feedback pulse.

Having thus described our invention, we claim:

1. An electronic system for controlling the position of an output member in accordance with input data, comprising:
   record means operative to provide input data to the system;
   means for establishing an electrical representation of information on said record representing a commanded position of the output member;
   means for establishing an electrical representation of the actual position of the output member;
   a motor system operative to drive the output member at either a high or a low speed depending upon the relation of the actual position of the output member to the commanded position;
   first serial means operative to receive the representations of the commanded position and the actual position in serial form and to operate upon these two signals so as to provide a single serial signal representative of the difference between the actual position and the commanded position;
   and fully serial means operative to receive said serial difference signal and to provide one of three output depending upon whether the command and position signals are in accord, different with their difference below a predetermined magnitude, or different with their difference above the predetermined magnitude, such means being operatively connected to said motor system.

2. An electronic system for controlling the position of an output member in accordance with input data, comprising:
   record means operative to provide input data to the system;
   means for establishing an electrical representation of information on said record representing a commanded position of the output member;
   means for establishing an electrical representation of the actual position of the output member;
   a motor system operative to drive the output member at either a high or a low speed depending upon the relation of the actual position of the output member to the commanded position;
   first serial means operative to receive the representations of the commanded position and the actual position in serial form and to operate upon these two signals so as to provide a single serial signal representative of the difference between the actual position and the commanded position;
   and second fully serial means including a first two state device operative to receive said difference signal and to determine identity between said command and position signals and a second two state device operative to receive said difference signal and to detect the magnitude of the difference between the command and the position signals.

3. An electronic system for controlling the position of an output member in accordance with numerical data, comprising:
   a motor system connected to the output member and operative to drive the output member at one of two speeds;
   a record containing a commanded position of the output member in numerical form;
   means for reading said record and establishing a digital electrical representation of the commanded position of the output member;
   transducer means connected to said output member and operative to provide electrical signals indicative of the motion of the output member;
   means for receiving the electrical signals indicative of the motion of the output member and for establishing a digital electrical signal representative of the actual position of the output member;
   first serial means operative to serially receive one digit of the commanded position representation and one digit of the actual position representation simultaneously, and to operate upon these digits so as to generate a serial digital electrical signal representative of the difference between the commanded and actual positions of the output member;
   and fully serial comparison means operative to receive the serial signal representative of the difference between the actual and commanded positions of the output member and to provide a first output signal if the commanded and actual positions of the output member are in accord, a second output signal if the commanded and actual positions differ but their difference is below a predetermined magnitude, and a third output signal if the command and actual positions differ and their difference is greater than the predetermined magnitude.

4. The system of claim 3 wherein the means for receiving the electrical signal indicative of the motion of the output member and for establishing a digital electrical signal representative of the actual position of the output member, comprises:
   first and second flip-flops, said first flip-flop being operative to be reset by electrical pulses indicating a motion of the output member in a first direction and to be set by electrical pulses indicating a motion of the output device in a second direction which occur at such time as the second flip-flop is reset;
   said second flip-flop being operative to be reset by said electrical pulses indicating a motion of the output device in said second direction and to be set by said electrical pulses indicating motion of the output member in said first direction which occur at such time as said first flip-flop is reset;
   means for setting each of said flip-flops at such time as the other flip-flop is set and the end of a predetermined cycle occurs;
   means for providing an output pulse representing a motion in a first direction upon the setting of the first flip-flop at such end of cycle time; and means for providing an output pulse representing a motion in a second direction upon the setting of said second flip-flop at said end of cycle time.

5. An electronic system for controlling the position of an output number in accordance with numerical data, comprising:
   a motor system operative to drive the output member;
   a record containing a commanded position of the output member with respect to a reference point in numerical form;
   means for reading said record and establishing a digital representation of the commanded position of the output member, said representation being either in a first or second numerical form depending upon the direction of the commanded position with respect to the reference point;
   transducer means connected to said output member and operative to provide electrical signals indicative of the motion of the output member;
   means for receiving the electrical signals indicative of the motion of the output member and for establishing a digital electrical signal representative of the actual position of the output member, said digital electrical signal being in either a first or second form depending upon the absolute position of the output member with respect to the reference point;
   first serial means operative to serially receive one digit of the commanded position representation and one digit of the actual position representation simulously and to operate upon these digits so as to generate a serial digital electrical signal representative of the difference between the commanded and actual positions of the output member;

and fully serial comparison means operative to receive the serial signals representative of the difference between the actual and commanded positions of the output member and to provide a first output signal if the commanded and actual positions of the output member are in accord, a second output signal if the commanded and actual positions differ but their difference is below a predetermined magnitude, and a third output signal if the commanded and actual positions differ and their difference is greater than the predetermined magnitude.

6. An electronic system for controlling the position of an output number in accordance with numerical data, comprising:

a motor system connected to the output member operative to drive the output member at one of two speeds;

a record containing a commanded position of the output member with respect to a reference point in numerical form;

means for reading said record and establishing a digital representation of the commanded position of the output member said representation being either in a first or second numerical form depending upon the direction of the commanded position with respect to the reference point;

transducer means connected to said output member and operative to provide electrical signals indicative of the motion of the output member;

means for receiving the electrical signals indicative of the motion of the output member and for establishing a digital electrical signal representative of the actual position of the output member, said digital electrical signal being in either a first or second form depending upon the absolute position of the output member with respect to the reference point;

an adder operative to serially receive one digit of the commanded position representation and one digit of the actual position representation simultaneously and to generate a serial digital electrical signal representative of the difference between the commanded and actual positions of the output member;

and fully comparison means operative to receive the serial signal representative of the difference between the actual and commanded positions of the output member and to provide a first output signal if the commanded and actual positions of the output member are in accord, a second output signal if the commanded and actual positions differ but their difference is below a predetermined magnitude, and a third output signal if the commanded and actual positions differ and their difference is greater than the predetermined magnitude.

7. An electronic system for controlling the position of an output number in accordance with numerical data, comprising:

a motor system connected to the output member operative to drive the output member at one of two speeds;

a record containing a commanded position of the output member with respect to a reference point;

means for reading said record and establishing a digital representation of the commanded position of the output member, said representation being either in a first or second numerical form depending upon the direction of the commanded position with respect to the reference point;

transducer means connected to the said output member and operative to provide discrete electrical pulses in timed relation to each incremental movement of the output member;

means for detecting the instantaneous direction of motion of the output member;

means for receiving the electrical signals indicative of the motion of the output member and for establishing a digital electrical signal representative of the actual position of the output member, said digital electrical signal being in either a first or second form depending upon the absolute position of the output member with respect to the reference point;

an adder operative to serially receive one digit of the commanded position representation and one digit of the actual position representation simultaneously and to generate a serial digital electrical signal representative of the difference between the commanded and actual positions of the output member;

and means operative to receive the serial signal representative of the difference between the actual and commanded positions of the output member and to provide a first output signal if the commanded and actual positions of the output member are in accord, a second output signal if the commanded and actual positions differ but their difference is below a predetermined magnitude, and a third output signal if the command and actual positions differ and their difference is greater than the predetermined magnitude.

8. An electronic system for controlling the position of an output member in accordance with numerical data, comprising:

a motor system connected to the output member and operative to drive the output member at one of two speeds;

a record containing a commanded position of the output member in numerical form, said commanded position being expressed as an absolute distance from a predetermined reference point and the direction of that distance;

means for reading said record and establishing a digital electrical representation of the commanded position of the output member, said representation being in straight binary form if the commanded position is in a first direction with respect to a reference point and being in complementary form if said commanded position is in second direction with respect to said reference point;

transducer means connected to said output member and operative to provide electrical signals indicative of the motion of output member, said signals including pulses representative of the discrete motion of the output member and a means for determining the direction of the motion of the output member;

means for receiving the electrical signals indicative of the motion of the output member and for establishing a digital electrical signal representative of the actual position of the output member, said digital electrical signal being in ordinary form if the actual position of the output member is in a first direction from said reference point and complementary form if the actual position of the output member is in a second direction from the said reference point;

an adder operative to receive the electrical representation of the commanded position of the output member and the electrical representation of the actual position of the output member;

and comparison means operative to receive the output of the adder and to provide a first output signal if the output of the adder is zero, a second output signal if the sum of the adder is non-zero but below a predetermined magnitude, and a third output signal if the sum of the adder is non-zero and greater than the predetermined magnitude.

9. An electronic system for controlling the position of an output member in accordance with numerical data, comprising:

a motor system connected to the output member and operative to drive the output member at one of two speeds;

a record containing a commanded position expressed as an absolute distance from a predetermined reference point and the direction of that distance;

means for reading said record and establishing a digital electrical representation of the commanded position of the output member, said representation being in straight binary form if the commanded position is in a first direction with respect to a reference point and in complementary form if said commanded position is in a second direction with respect to said reference point;

transducer means connected to said output member and operative to provide electrical signals indicative of the motion of output member, said signals including pulses representative of the discrete motion of the output member and a means for determining the direction of the motion of the output member;

means for receiving the electrical signals indicative of the motion of the output member and for establishing a digital electrical signal representative of the actual position of the output member, said digital electrical signal being in ordinary form if the actual position of the output member is in a first direction from said reference point and complementary form if the actual position of the output member is in a second direction from the said reference point;

a serial adder operative to serially receive one digit of the commanded position representation and one digit of the actual position representation simultaneously and to operate upon these digits so as to generate a serial digital electrical signal representative of the difference between the commanded and actual positions of the output member;

and comparison means operative to receive the output of the adder and to provide a first output signal if the output of the adder is zero, a second output signal if the sum of the adder is non-zero but below a predetermined magnitude, and a third output signal if the sum of the adder is non-zero and greater than the predetermined magnitude.

10. An electronic system for controlling the position of an output member in accordance with the input data, comprising:

a record containing a commanded position of the output member in numerical form, said position being expressed as the distance from a reference point and the direction of such difference;

means for reading said record and establishing a digital electrical representation of the commanded position of the output in straight binary form if the commanded position is in a first direction from the reference point or in complementary form if the commanded position is in a second direction from the reference point;

means for generating electrical signals indicative of the motion of the output member and for establishing a digital electrical representation of the actual position of the output member, said representation being in straight binary form if the actual position is in said first direction from said reference point and complementary form if said actual position is in said second direction from said reference point;

an adder operative to receive the representations of the commanded and the actual positions of the output member, and to add the two;

comparison means operative to receive the output of said adder and to generate an electrical signal representative of the difference between the commanded position and the actual position;

and a motor system operative to receive said signal from said comparison means so as to drive the output member to the commanded position.

11. An electronic system for controlling the position of an output member in accordance with input data, comprising:

a record containing a commanded position of the output member in numerical form, said position being expressed as the distance from a reference point and the direction of such difference;

means for reading said record and establishing a digital electrical representation of the commanded position of the output member in straight binary form if the commanded position is in a first direction from the reference point or in complementary form if the commanded position is in a second direction from the reference point;

means for generating electrical signals indicative of the motion of the output member and for establishing a digital electrical representation of the actual position of the output member, said representation being in straight binary form if the actual position is in said first direction from said reference point and complementary form if said actual position is in said second direction from said reference point;

a serial adder operative to receive one digit of the digital representation of the commanded position and one digit of the representation of the actual position simultaneously, and to operate upon these digits so as to generate serial digital signals representative of the difference between commanded and actual positions of the output member;

a motor system connected to the output member;

and a control means operative to receive the output of the adder to provide signals to the motor system to cause it to drive the output member to the command position.

12. In an electronic system for controlling the position of an output member in accordance with the numerical data and having a motor system drivingly connected to the output member, a record containing a commanded position of the output member in numerical form, means for reading said record, establishing a digital electrical representation of the information on the record and converting said representation into one of two forms depending upon the direction of the commanded position from a reference point and means for establishing a digital electrical signal representing the actual position of the output member connected to the motor system, the improvements comprising:

an adder;

and a control means operative to connect the adder so as to either assist in the conversion of the information on the record to the digital electrical representation or to receive the representations of the commanded position and the actual position of the output and sum them.

13. In an electronic system for controlling the position of an output member in accordance with numeral data and having a motor system drivingly connected to the output member, a record containing a commanded position of the output member in numerical form, means for reading said record, establishing a digital electrical representation of the information on the record, converting said representation into one of two forms depending upon the direction of the commanded position from a reference point, and means for establishing a digit electrical signal representing the actual position of the output member connected to the motor system, the improvements comprising:

a control system operative to place the system in either a first mode, wherein information is read from said record and converted into the required digital electrical representation of the commanded position, or a second mode wherein the digital representation of the actual and commanded positions of the output member are compared and a signal is generated to control the motor system so as to drive the output member to the commanded position;

and an adder connected within said system and provided with conditioning elements on its inputs and outputs so that it may be connected so as to assist in the conversion of the record data into the electrical representation of the commanded position during said first mode and connected so as to receive the electrical representation of the actual and commanded positions of the output member during the second mode.

14. In an electronic system for controlling the position of an output member in accordance with input data which has record means operative to provide input data to the system, means for converting certain information on said record means into an electrical representation of either a first or second form depending upon the sign of motion commanded by the information on record means for establishing an electrical representation of the actual position of the output member in either a first or second form depending upon the direction of the actual position of the output member from a reference position, and means for comparing the actual and commanded positions of the output member in order to determine the necessary direction of motion of the output member to arrive at the commanded position, the improvement which comprises:

the provision of a cycle control operative to connect the system in either first mode wherein data on the record is converted into the required form of a commanded position of the output member, or a second mode wherein the actual and commanded positions of the output member are compared, said system switching from said first to said second mode upon the completion of the conversion of the last bit of information on said record to the required form, and switching from said second to said first mode upon output member attaining the commanded position.

15. An electronic system for controlling the position of an output member in accordance with input data, comprising:

record means operative to provide the input data to the system;

means for establishing an electrical representation of information on said record representing a commanded position of the output member;

means for establishing an electrical representation of the actual position of the output member;

a motor system operative to drive the output member at a speed dependent upon an input electrical signal;

means for operating upon either the electric representation of the commanded position or the electrical representation of the actual position to convert such representation to a different numerical form;

first serial means operative to receive either the electrical representation of the commanded position or the electrical of the actual position and the output of said operating means and to operate upon these two signals so as to provide a single serial signal representative of the difference between the actual position and the commanded position of the output member;

second serial means including a first two-stage device operative to receive said difference signal and to determine the difference between said command and position signals and a second two-stage device operative to receive said difference signal and to detect the magnitude of the difference between the command and position signals, said second serial means providing an input signal to said motor system.

16. An electronic system for controlling the position of an output member in accordance with the input data, comprising:

a record containing a commanded position of the output member in numerical form, said position being expressed as the distance from a reference point and the direction of such difference;

means for reading said record and establishing a digital electrical representation of the commanded position of the output in straight binary form if the commanded position is in a first direction from the reference point or in complementary form if the commanded position is in a second direction from the reference point;

means for generating electrical signals indicative of the motion of the output member and for establishing a digital electrical representation of the actual position of the output member, said representation being in straight binary form if the actual position is in said first direction from said reference point and complementary form if said actual position is in said second direction from said reference point;

serial means operative to receive the representation of the actual position of the output member and to selectively derive the complement of said representation depending upon the nature of an input signal;

a serial adder operative to receive one digit of the digital signal representing the commanded position and one digit of the output of said selective complementing device simultaneously and to operate upon these digits so as to generate serial digital signals representative of the difference between the commanded and the actual position of the output member;

a motor system connected to the output member;

a control means operative to receive the output of the adder and to provide signals to the motor system to cause it to drive the output member to the command position and to the selective complementing device so as to cause said device to complement the representation of position if the difference between the commanded and actual position is of a first sign and to refrain from complementing the representation if the difference between the actual and commanded positions is of a second sign.

17. An electronic system for controlling the position of an output member in accordance with input data, comprising:

a record containing a commanded position of the output member in numerical form, said position being expressed as the distance from a reference point and the direction of such difference;

means for reading said record and establishing a digital electrical representation of the commanded position of the output in straight binary form if the commanded position is in a first direction from the reference point or in complementary form if the commanded position is in a second direction from the reference point;

means for generating electrical signals indicative of the motion of the output member and for establishing a digital electrical representation of the actual position of the output member, said representation being in straight binary form if the actual position is in said first direction from said reference point and complementary form if said actual position is in said second direction from said reference point;

means for selectively taking the complement of the representation of the actual position of the output member;

an adder operative to receive the representation of the commanded position of the output member and the output of said selective complementing means, and to add the two;

comparison means operative to receive the output of said adder and to generate an electrical signal representative of the difference between the commanded and the actual positions;

a connection between said comparison means and said selective complement means operative to cause said selective complementor to take the complement of the representation of the actual position if the sign of the difference between the actual and commanded positions is in a first direction and to refrain from generating the complement of the representation of as an absolute distance from a predetermined reference point and the direction of that distance;

means for reading said record and establishing a digital electrical representation of the commanded position of the output member, said representation being in straight binary form if the commanded position is in a first direction with respect to a reference point and in complementary form if said commanded position is in a second direction with respect to said reference point;

transducer means connected to said output member and operative to provide electrical signals indicative of the motion of output member, said signals including pulses representative of the discrete motion of the output member and a means for determining the direction of the motion of the output member;

means for receiving the electrical signals indicative of the motion of the output member and for establishing a digital electrical signal representative of the actual position of the output member, said digital electrical signal being in ordinary form if the actual position of the output member is in a first direction from said reference point and complementary form if the actual position of the output member is in a second direction from the said reference point;

a serial adder operative to serially receive one digit of the commanded position representation and one digit of the actual position representation simultaneously and to operate upon these digits so as to generate a serial digital electrical signal representative of the difference between the commanded and actual positions of the output member;

and comparison means operative to receive the output of the adder and to provide a first output signal if the output of the adder is zero, a second output signal if the sum of the adder is non-zero but below a predetermined magnitude, and a third output signal if the sum of the adder is non-zero and greater than the predetermined magnitude.

10. An electronic system for controlling the position of an output member in accordance with the input data, comprising:

a record containing a commanded position of the output member in numerical form, said position being expressed as the distance from a reference point and the direction of such difference;

means for reading said record and establishing a digital electrical representation of the commanded position of the output in straight binary form if the commanded position is in a first direction from the reference point or in complementary form if the commanded position is in a second direction from the reference point;

means for generating electrical signals indicative of the motion of the output member and for establishing a digital electrical representation of the actual position of the output member, said representation being in straight binary form if the actual position is in said first direction from said reference point and complementary form if said actual position is in said second direction from said reference point;

an adder operative to receive the representations of the commanded and the actual positions of the output member, and to add the two;

comparison means operative to receive the output of said adder and to generate an electrical signal representative of the difference between the commanded position and the actual position;

and a motor system operative to receive said signal from said comparison means so as to drive the output member to the commanded position.

11. An electronic system for controlling the position of an output member in accordance with input data, comprising:

a record containing a commanded position of the output member in numerical form, said position being expressed as the distance from a reference point and the direction of such difference;

means for reading said record and establishing a digital electrical representation of the commanded position of the output member in straight binary form if the commanded position is in a first direction from the reference point or in complementary form if the commanded position is in a second direction from the reference point;

means for generating electrical signals indicative of the motion of the output member and for establishing a digital electrical representation of the actual position of the output member, said representation being in straight binary form if the actual position is in said first direction from said reference point and complementary form if said actual position is in said second direction from said reference point;

a serial adder operative to receive one digit of the digital representation of the commanded position and one digit of the representation of the actual position simultaneously, and to operate upon these digits so as to generate serial digital signals representative of the difference between commanded and actual positions of the output member;

a motor system connected to the output member;

and a control means operative to receive the output of the adder to provide signals to the motor system to cause it to drive the output member to the command position.

12. In an electronic system for controlling the position of an output member in accordance with the numerical data and having a motor system drivingly connected to the output member, a record containing a commanded position of the output member in numerical form, means for reading said record, establishing a digital electrical representation of the information on the record and converting said representation into one of two forms depending upon the direction of the commanded position from a reference point and means for establishing a digital electrical signal representing the actual position of the output member connected to the motor system, the improvements comprising:

an adder;

and a control means operative to connect the adder so as to either assist in the conversion of the information on the record to the digital electrical representation or to receive the representations of the commanded position and the actual position of the output and sum them.

13. In an electronic system for controlling the position of an output member in accordance with numeral data and having a motor system drivingly connected to the output member, a record containing a commanded position of the output member in numerical form, means for reading said record, establishing a digital electrical representation of the information on the record, converting said representation into one of two forms depending upon the direction of the commanded position from a reference point, and means for establishing a digit electrical signal representing the actual position of the output member connected to the motor system, the improvements comprising:

a control system operative to place the system in either a first mode, wherein information is read from said record and converted into the required digital electrical representation of the commanded position, or a second mode wherein the digital representation of the actual and commanded positions of the output member are compared and a signal is generated to control the motor system so as to drive the output member to the commanded position;

and an adder connected within said system and provided with conditioning elements on its inputs and outputs so that it may be connected so as to assist in the conversion of the record data into the electrical representation of the commanded position during said first mode and connected so as to receive the electrical representation of the actual and commanded positions of the output member during the second mode.

14. In an electronic system for controlling the position of an output member in accordance with input data which has record means operative to provide input data to the system, means for converting certain information on said record means into an electrical representation of either a first or second form depending upon the sign of motion commanded by the information on record means for establishing an electrical representation of the actual position of the output member in either a first or second form depending upon the direction of the actual position of the output member from a reference position, and means for comparing the actual and commanded positions of the output member in order to determine the necessary direction of motion of the output member to arrive at the commanded position, the improvement which comprises:

the provision of a cycle control operative to connect the system in either first mode wherein data on the record is converted into the required form of a commanded position of the output member, or a second mode wherein the actual and commanded positions of the output member are compared, said system switching from said first to said second mode upon the completion of the conversion of the last bit of information on said record to the required form, and switching from said second to said first mode upon output member attaining the commanded position.

15. An electronic system for controlling the position of an output member in accordance with input data, comprising:

record means operative to provide the input data to the system;

means for establishing an electrical representation of information on said record representing a commanded position of the output member;

means for establishing an electrical representation of the actual position of the output member;

a motor system operative to drive the output member at a speed dependent upon an input electrical signal;

means for operating upon either the electric representation of the commanded position or the electrical representation of the actual position to convert such representation to a different numerical form;

first serial means operative to receive either the electrical representation of the commanded position or the electrical of the actual position and the output of said operating means and to operate upon these two signals so as to provide a single serial signal representative of the difference between the actual position and the commanded position of the output member;

second serial means including a first two-stage device operative to receive said difference signal and to determine the difference between said command and position signals and a second two-stage device operative to receive said difference signal and to detect the magnitude of the difference between the command and position signals, said second serial means providing an input signal to said motor system.

16. An electronic system for controlling the position of an output member in accordance with the input data, comprising:

a record containing a commanded position of the output member in numerical form, said position being expressed as the distance from a reference point and the direction of such difference;

means for reading said record and establishing a digital electrical representation of the commanded position of the output in straight binary form if the commanded position is in a first direction from the reference point or in complementary form if the commanded position is in a second direction from the reference point;

means for generating electrical signals indicative of the motion of the output member and for establishing a digital electrical representation of the actual position of the output member, said representation being in straight binary form if the actual position is in said first direction from said reference point and complementary form if said actual position is in said second direction from said reference point;

serial means operative to receive the representation of the actual position of the output member and to selectively derive the complement of said representation depending upon the nature of an input signal;

a serial adder operative to receive one digit of the digital signal representing the commanded position and one digit of the output of said selective complementing device simultaneously and to operate upon these digits so as to generate serial digital signals representative of the difference between the commanded and the actual position of the output member;

a motor system connected to the output member;

a control means operative to receive the output of the adder and to provide signals to the motor system to cause it to drive the output member to the command position and to the selective complementing device so as to cause said device to complement the representation of position if the difference between the commanded and actual position is of a first sign and to refrain from complementing the representation if the difference between the actual and commanded positions is of a second sign.

17. An electronic system for controlling the position of an output member in accordance with input data, comprising:

a record containing a commanded position of the output member in numerical form, said position being expressed as the distance from a reference point and the direction of such difference;

means for reading said record and establishing a digital electrical representation of the commanded position of the output in straight binary form if the commanded position is in a first direction from the reference point or in complementary form if the commanded position is in a second direction from the reference point;

means for generating electrical signals indicative of the motion of the output member and for establishing a digital electrical representation of the actual position of the output member, said representation being in straight binary form if the actual position is in said first direction from said reference point and complementary form if said actual position is in said second direction from said reference point;

means for selectively taking the complement of the representation of the actual position of the output member;

an adder operative to receive the representation of the commanded position of the output member and the output of said selective complementing means, and to add the two;

comparison means operative to receive the output of said adder and to generate an electrical signal representative of the difference between the commanded and the actual positions;

a connection between said comparison means and said selective complement means operative to cause said selective complementor to take the complement of the representation of the actual position if the sign of the difference between the actual and commanded positions is in a first direction and to refrain from generating the complement of the representation of the actual position if the sign of the difference between the actual and commanded positions is in a second direction;

and a motor system operative to receive said signal from said comparison means so as to drive the output member to the commanded position.

18. An electric system for controlling the position of an output member in accordance with input data, comprising:

record means operative to provide input data to the system;

means for establishing an electrical representation of information on said record representing a commanded position of the output member;

means for establishing an electrical representation of the actual position of the output member;

a motor system operative to drive the output member at either a high or a low speed depending upon the relation of the actual position of the output member to the commanded position;

first serial means operative to receive the representations of the commanded position and the actual position in serial form and to operate upon these two signals so as to provide a single serial signal having one of two possible numerical codes, the particular code chosen being dependent upon the relative differences between the actual position and the commanded position;

and means operative to receive said serial difference signal and to provide one of three outputs depending upon whether the command and position signals are in accord, different with their difference below a predetermined magnitude, or different with their difference above the predetermined magnitude, such means being operatively connected to said motor system.

19. The electronic system of claim 18 wherein the means operative to receive said serial difference signal is itself fully serial.

20. An electronic system for controlling the position of an output member in accordance with input data, comprising:

record means operative to provide input data to the system;

means for establishing an electrical representation of information on said record representing a commanded position of the output member;

means for establishing an electrical representation of the actual position of the output member;

a motor system operative to drive the output member at either a high or a low speed depending upon the relation of the actual position of the output member to the commanded position;

first serial means operative to receive the representations of the commanded position and the actual position in serial form and to operate upon these two signals so as to provide a single serial signal in a code having a property such that fully serial means can detect the magnitude and difference between the actual position and the commanded position;

and means operative to receive said serial difference signal and to provide one of three outputs depending upon whether the command and position signals are in accord, different with their difference below a predetermined magnitude, or different with their difference above the predetermined magnitude, such means being operatively connected to said motor system.

21. The electronic system of claim 20 wherein the first serial means repeatedly receives the representations of the commanded position and the actual position to provide said single serial signal and the form of the code of said signal is chosen on the basis of the output, during the previous cycle, of the means operative to receive the serial signal.

22. The electronic system of claim 20 wherein the first serial means operative to receive the representation of the commanded position and the actual position in serial form repeatedly receives such representations and operates on them to provide a single serial signal which is provided to the means operative to receive such serial difference signal, and the means operative to receive such serial difference signal is set previous to the receipt of a serial difference signal in a particular mode, which mode is dependent upon the nature of the output of the means operative to receive said serial difference signal at the end of the previous cycle.

23. The electronic system of claim 22, wherein the nature of the single serial signal provided as an output of the first serial means is dependent upon the output of the means operative to receive said serial difference signal at the end of the previous cycle.

References Cited

UNITED STATES PATENTS

| | | | |
|---|---|---|---|
| 2,685,054 | 7/1954 | Brenner et al. | 318—28 |
| 2,997,638 | 8/1961 | Brittain | 318—28 X |
| 3,105,927 | 10/1963 | Flatten et al. | 318—18 |
| 3,127,587 | 3/1964 | Rasmussen et al. | 318—18 |
| 3,172,026 | 3/1965 | Schuman | 318—28 |

BENJAMIN DOBECK, *Primary Examiner.*